(12) United States Patent
Zhou et al.

(10) Patent No.: US 9,117,001 B2
(45) Date of Patent: Aug. 25, 2015

(54) METHOD AND SYSTEM FOR CROSS-TERMINAL CLOUD BROWSING

(71) Applicant: TENCENT TECHNOLOGY (SHENZHEN) COMPANY LIMITED, Shenzhen (CN)

(72) Inventors: Ruiyi Zhou, Shenzhen (CN); Bo Hu, Shenzhen (CN); Xi Wang, Shenzhen (CN); Kai Zhang, Shenzhen (CN); Zhengkai Xie, Shenzhen (CN); Bosen He, Shenzhen (CN); Huijiao Yang, Shenzhen (CN); Ying Huang, Shenzhen (CN); Yulei Liu, Shenzhen (CN); Wei Li, Shenzhen (CN); Tingyong Tang, Shenzhen (CN); Sha Mo, Shenzhen (CN); Cheng Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/142,855

(22) Filed: Dec. 29, 2013

(65) Prior Publication Data
US 2014/0110473 A1     Apr. 24, 2014

Related U.S. Application Data

(63) Continuation of application No. PCT/CN2013/084197, filed on Sep. 25, 2013.

(51) Int. Cl.
*G06F 17/00* (2006.01)
*G06F 17/30* (2006.01)

(52) U.S. Cl.
CPC .... *G06F 17/30879* (2013.01); *G06F 17/30846* (2013.01)

(58) Field of Classification Search
USPC .............. 235/375, 380, 379, 462.45, 462.46, 235/462.13, 472.01, 472.02, 472.03, 462.47
IPC ...... G06Q 30/02,20/341, 20/1085; G07F 19/20, G07F 7/1008; G06K 7/10851, 7/10881, 17/022, G06K 7/10772
See application file for complete search history.

(56) References Cited

U.S. PATENT DOCUMENTS

2008/0275852 A1    11/2008   Nakamura
2012/0210211 A1     8/2012   Min et al.
2013/0050259 A1*    2/2013   Ahn et al. .................... 345/633

FOREIGN PATENT DOCUMENTS

CN          1867142 A       11/2006
CN        101187974 A        5/2008
(Continued)

OTHER PUBLICATIONS

The World Intellectual Property Organization (WIPO) International Search Report for PCT/CN2013/084197 Jan. 2, 2014.

*Primary Examiner* — Karl D Frech
(74) *Attorney, Agent, or Firm* — Anova Law Group, PLLC

(57) ABSTRACT

A method is provided for cross-terminal cloud browsing on the Internet. The method includes a second terminal obtaining a 2D bar code generated by a first terminal corresponding to a web content currently being presented on a webpage on the first terminal. The 2D bar code includes at least presentation information of the web content. The method also includes the second terminal parsing the 2D bar code to obtain the presentation information of the web content contained in the 2D bar code. Further, the method includes the second terminal establishing a link using the presentation information of the web content to realize cross-terminal presentation of the web content on the second terminal.

19 Claims, 5 Drawing Sheets

(56) References Cited

FOREIGN PATENT DOCUMENTS

| CN | 101964044 A | 2/2011 |
| CN | 102609544 A | 7/2012 |
| CN | 102647618 A | 8/2012 |
| CN | 102902761 A | 1/2013 |

* cited by examiner

METHOD AND SYSTEM FOR CROSS-TERMINAL CLOUD BROWSING

CROSS-REFERENCES TO RELATED APPLICATIONS

This application is a continuation application of PCT Patent Application No. PCT/CN2013/084197, filed on Sep. 25, 2013, which claims priority of Chinese Patent Application No. 201210360904.6, filed on Sep. 25, 2012, the entire contents of both of which are incorporated by reference herein.

FIELD OF THE INVENTION

The present invention generally relates to computer technologies and, more particularly, to a method and system for cross-terminal cloud browsing.

BACKGROUND

With the development of computer application technologies, users can connect to the Internet to watch videos posted on video websites through mobile phones, laptops and tablets. In practical applications, a user may need a 'resume playback' function when he/she is watching a video. That is, the user can pause the playing video and resume playback in the future from the previously paused position. However, most of the current video websites remember histories of viewed videos on different terminals only when the user logins to his/her account and watches the videos in the user's account. The user needs to re-login to his/her account to continue watching the video that was previously paused using the 'resume playback' function of the video websites for performing a playback operation from the point where the user last stopped.

That is, with the current technologies, only users with login accounts can use the cross-terminal 'resume playback' function of the video websites; whereas users without login accounts cannot use the cross-terminal 'resume playback' function, greatly reducing the user experience.

The disclosed method and system are directed to solve one or more problems set forth above and other problems.

BRIEF SUMMARY OF THE DISCLOSURE

One aspect of the present disclosure includes a method for cross-terminal cloud browsing. The method includes a second terminal obtaining a 2D bar code generated by a first terminal corresponding to a web content currently being presented on a webpage on the first terminal. The 2D bar code includes at least presentation information of the web content. The method also includes the second terminal parsing the 2D bar code to obtain the presentation information of the web content contained in the 2D bar code. Further, the method includes the second terminal establishing a link using the presentation information of the web content to realize cross-terminal presentation of the web content on the second terminal.

Another aspect of the present disclosure includes a system for cross-terminal cloud browsing. The system includes a terminal. The terminal is configured to an obtaining unit configured to obtain a 2D bar code generated by a source terminal corresponding to a web content currently being presented on a webpage on the source terminal. The 2D bar code includes at least presentation information of the web content. The system also includes a parsing unit configured to parse the 2D bar code to obtain the presentation information of the web content contained in the 2D bar code. Further, the system includes a linking unit configured to establish a link using the presentation information of the web content to realize cross-terminal presentation of the web content on the second terminal.

Another aspect of the present disclosure includes a system for cross-terminal cloud browsing. The system includes a first terminal and a second terminal. The first terminal is configured to generate a 2D bar code corresponding to a web content currently being presented on a webpage, and the 2D bar code includes at least presentation information of the web content. The second terminal includes an obtaining unit, a parsing unit, and a linking unit. The obtaining unit is configured to obtain a 2D bar code generated by a source terminal corresponding to a web content currently being presented on a webpage on the source terminal. The 2D bar code includes at least presentation information of the web content. The parsing unit is configured to parse the 2D bar code to obtain the presentation information of the web content contained in the 2D bar code. Further, the linking unit is configured to establish a link using the presentation information of the web content to realize cross-terminal presentation of the web content on the second terminal.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions of the present invention or the existing technology, the figures which are needed to be used in the description of the present invention or the existing technology are briefly described in the following. Obviously, the figures in the following description are only some embodiments of the present invention, and it is easily for those skilled in the art to obtain other figures based on the following figures without creative work.

DETAILED DESCRIPTION

Reference will now be made in detail to exemplary embodiments of the invention, which are illustrated in the accompanying drawings.

Figure 6:
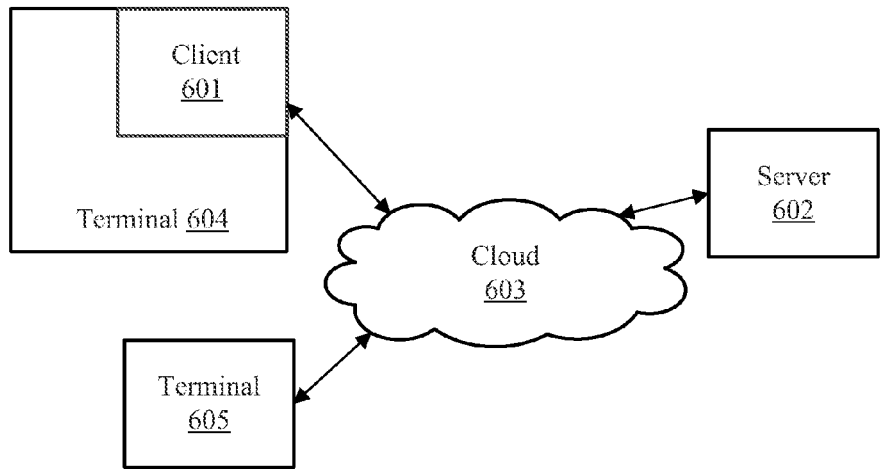
FIG. 6 illustrates an exemplary operating environment incorporating certain disclosed embodiments.

FIG. 6 illustrates an exemplary operating environment 600 incorporating certain disclosed embodiments. As shown in FIG. 6, environment 600 may include a terminal 604, a terminal 605, a cloud 603, and a server 602. The cloud 603 may include various servers and other components to implement a cloud computing platform. For example, cloud 603 may include cloud servers (e.g., physical or virtual server computers), networks (e.g., the Internet or other types of computer networks or telecommunication networks, either wired or wireless.), network storages, databases, operating systems (OS), programming language execution environments, and web servers, etc.

Cloud 603 may include one or more cloud servers. Although only one cloud server 602 is shown, any number of cloud servers can be included. Alternatively, the cloud server 602 may be operated in a non-cloud computing environment, and cloud 603 may be an ordinary computer network providing communication channels for server 602 and terminals.

A server, as used herein, may refer to one or more server computers configured to provide certain web server functionalities to provide certain personalized services, which may require any user accessing the services to authenticate to the server before the access, such as online video services. A web server may also include one or more processors to execute computer programs in parallel.

The server 602 may include any appropriate server computers configured to provide certain server functionalities, such as a file server functionality for responding a user's request for cross-terminal cloud browsing operations or other application server.

Terminal 604 and terminal 605 may include any appropriate type of mobile computing devices, such as mobile phones, smart phones, tablets, notebook computers, or any type of computing platform. A terminal (e.g., terminal 604) may include one or more clients 601. The client 601, as used herein, may include any appropriate mobile application software, hardware, or a combination of application software and hardware to achieve certain client functionalities. For example, client 601 may include a browser, etc. According to actual needs in different terminals, a mobile client may be a browser installed on the terminal for browsing, including various types of existing and future browser installed on terminals. Although only one client 601 is shown in the environment 600, any number of clients 601 may be included.

Figure 7:
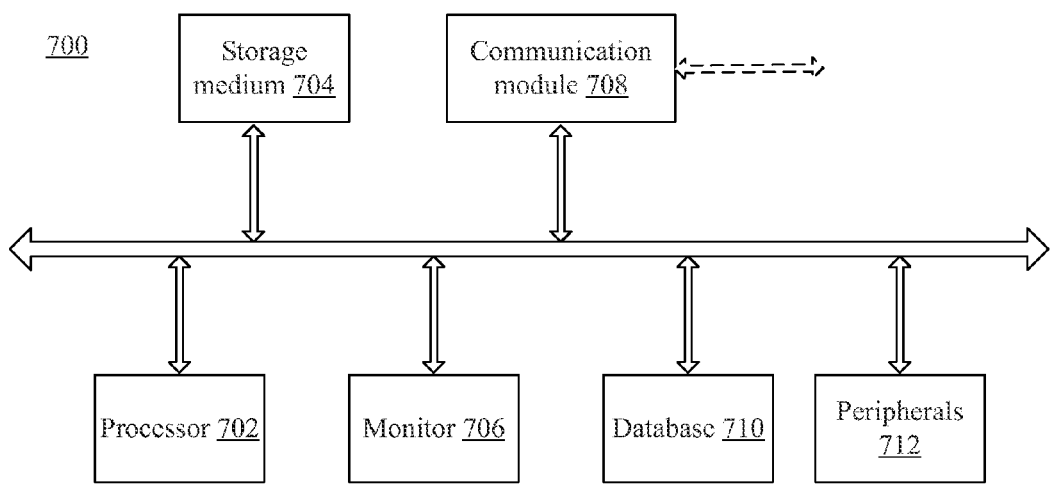
FIG. 7 illustrates a block diagram of an exemplary computer system consistent with the disclosed embodiments.

Terminal 604/605, client 601, and/or server 602 may be implemented on any appropriate computing platform. FIG. 7 illustrates a block diagram of an exemplary computer system 700 capable of implementing terminal 604/605, client 601, and/or server 602.

As shown in FIG. 7, computer system 700 may include a processor 702, a storage medium 704, a monitor 706, a communication module 708, a database 710, and peripherals 712. Certain devices may be omitted and other devices may be included.

Processor 702 may include any appropriate processor or processors. Further, processor 702 can include multiple cores for multi-thread or parallel processing. Storage medium 704 may include memory modules, such as Read-only memory (ROM), Random Access Memory (RAM), flash memory modules, and erasable and rewritable memory, and mass storages, such as CD-ROM, U-disk, and hard disk, etc. Storage medium 704 may store computer programs for implementing various processes, when executed by processor 702.

Further, peripherals 712 may include I/O devices such as keyboard and mouse, and communication module 708 may include network devices for establishing connections through the communication network. Database 710 may include one or more databases for storing certain data and for performing certain operations on the stored data, such as database searching.

Figure 1:
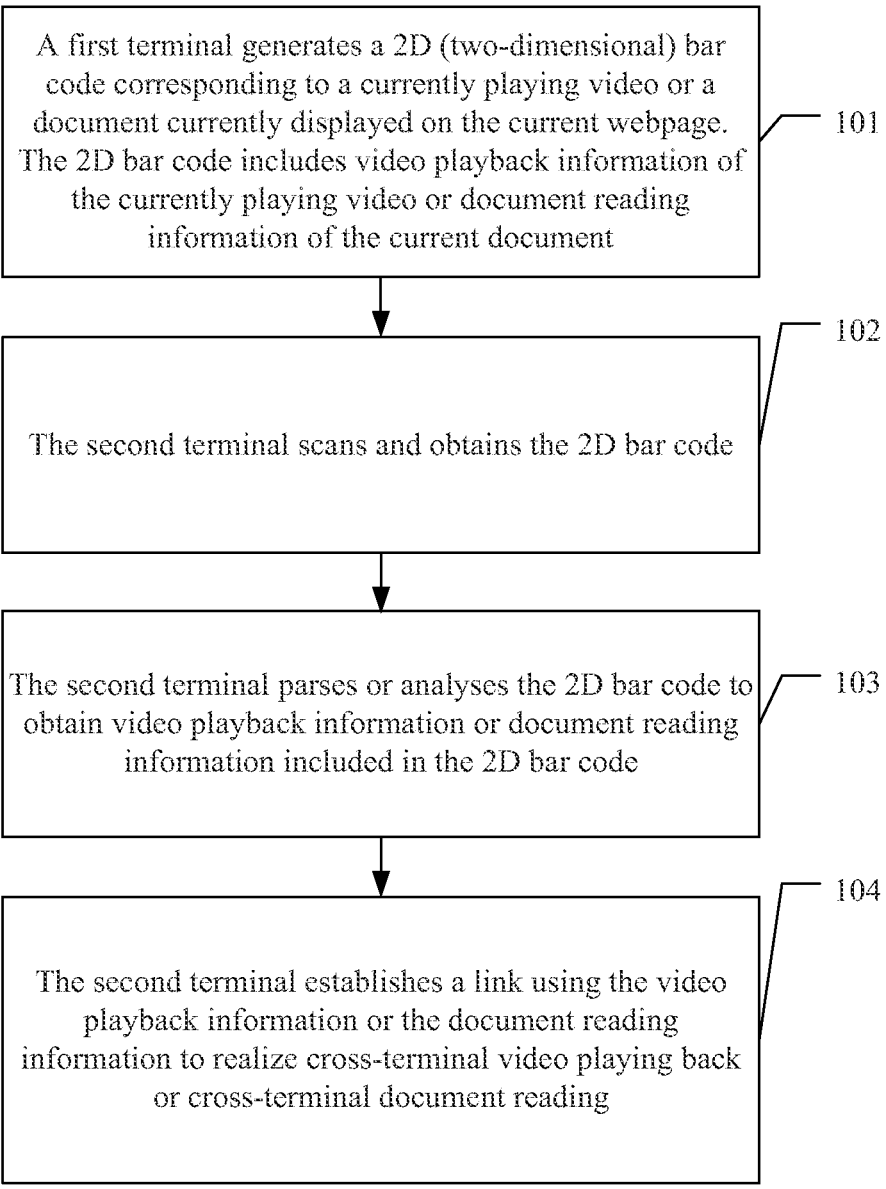
FIG. 1 illustrates a flow diagram of an exemplary cross-terminal cloud browsing method consistent with the disclosed embodiments.

In operation, terminals/clients and servers 602 may interact with each other to provide a cross-terminal cloud browsing service to the user(s) of the terminals. More particularly, the terminal 604 and the terminal 605 may be user terminals used by a user to browsing documents and/or playing back videos from one to the other (e.g., terminal 604 may be referred to as a first terminal and terminal 605 may be referred as a second terminal). For example, the terminal 604 may be a personal computer (PC) and the terminal 605 may be a mobile terminal. The server may be configured to provide and/or facilitate cross-terminal cloud browsing among multiple terminals (e.g., terminal 604, terminal 605). FIG. 1 illustrates a flow diagram of an exemplary cross-terminal cloud browsing process consistent with the disclosed embodiments.

As shown in FIG. 1, the cross-terminal cloud browsing process may include the following steps:

Step 101: a first terminal generates a 2D (two-dimensional) bar code corresponding to a currently playing video or a document currently displayed on the current webpage. The 2D bar code includes video playback information of the currently playing video or document reading information of the current document. The first terminal may also called a source terminal for generating the 2D bar code.

When a user watches a video or browses a document in the webpage using the first terminal, if the user needs to switch to a second terminal to continue watching the video or reading the document, the first terminal generates a 2D bar code corresponding to the currently playing video or the document displayed on the current webpage. The 2D bar code includes video playback information of the currently playing video or document reading information of the document.

Step 102: the second terminal scans and obtains the 2D bar code.

The second terminal that is used by the user to continue watching the video or reading the document may scan and obtain the 2D bar code. The second terminal may use any appropriate method to scan and obtain the 2D bar code.

Step 103: the second terminal parses or analyses the 2D bar code to obtain video playback information or document reading information included in the 2D bar code. That is, after the second terminal obtains the 2D bar code, the second terminal parses the 2D bar code to obtain video playback information or document reading information included in the 2D bar code.

Step 104: the second terminal establishes a link using the video playback information or the document reading information to realize cross-terminal video playing back or cross-terminal document reading.

That is, the second terminal establishes the link using the parsed video playback information or document reading information to realize cross-terminal video playing back or cross-terminal document reading, improving effectively the user experience.

Further, the first terminal may generate a 2D bar code corresponding to a web content currently being presented on a webpage, where the 2D bar code includes at least presentation information of the web content. Then, the second terminal obtains the 2D bar code generated by the first terminal. The second terminal also parses the 2D bar code to obtain the presentation information of the web content contained in the 2D bar code. The second terminal further establishes a link using the presentation information of the web content to realize cross-terminal presentation of the web content on the second terminal.

It should be understood that based on users' needs, the web content currently being presented on a webpage may be any video, audio, document, e-book, etc. There are no specific limitations on the web content currently being presented on a webpage. For example, when the web content is a currently playing video, the presentation information of the web content includes video playback information of the currently playing video; when the web content is a document, the presentation information of the web content includes document reading information of the currently displaying document.

Figure 2:
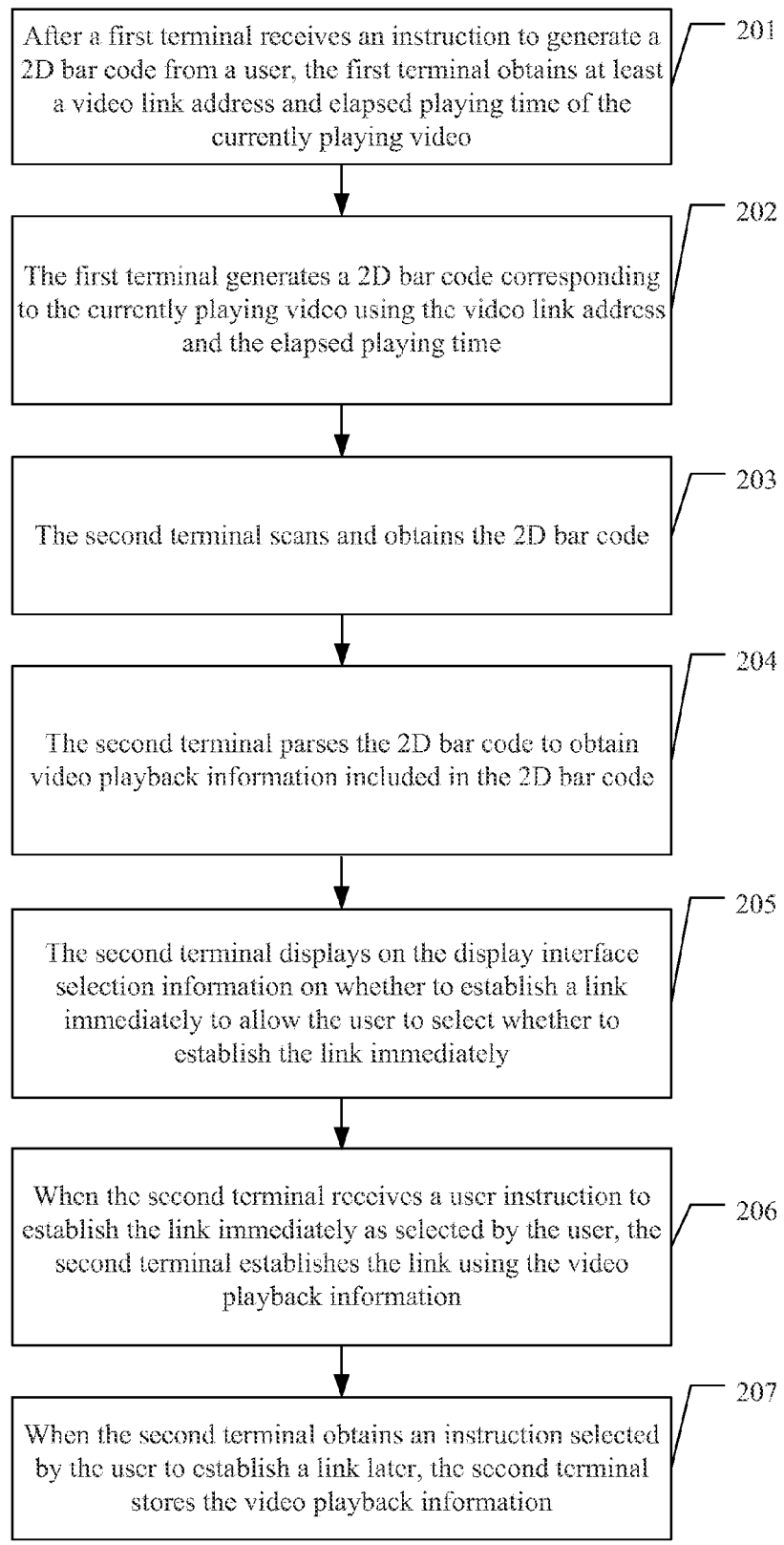
FIG. 2 illustrates a flow diagram of another exemplary cross-terminal cloud browsing method consistent with the disclosed embodiments.

FIG. 2 illustrates a flow diagram of another exemplary cross-terminal cloud browsing process consistent with the disclosed embodiments. As shown in FIG. 2, the cross-terminal cloud browsing process may include the following steps:

Step 201: after a first terminal receives an instruction to generate a 2D bar code from a user, the first terminal obtains at least a video link address and elapsed playing time of the currently playing video.

When a user plays a video using the first terminal, if the user needs to switch to a second terminal to continue watching the video, the user may operate the first terminal to send an instruction to generate a 2D bar code. After the first terminal receives the instruction of generating the 2D bar code from the user, the first terminal obtains at least the video link address and the elapsed playing time of the currently playing video.

For example, the user opens or runs a 2D bar code software installed on the first terminal and confirms the instruction of generating the 2D bar code corresponding to the currently playing video by clicking or typing, the first terminal generates the 2D bar code corresponding to the currently playing video.

The video link address refers to a link that the user needs to access for watching a video. The user uses the video link address to open video playing interface. The elapsed playing time refers to time period that a video has been played based on the total time length of the video.

In addition, the first terminal can also obtain playing setting information of the currently playing video, which may include video definition (standard definition, high definition, super definition, etc.), aspect ratio (4:3, 16:9, etc.) and background setting (turn on the light, turn off the light, and so on). Thus, the user can achieve configuration synchronization on the second terminal.

Step 202: the first terminal generates a 2D bar code corresponding to the currently playing video using the video link address and the elapsed playing time.

Step 203: the second terminal scans and obtains the 2D bar code. The user may use the second terminal to scan the 2D bar code, while the first terminal displays the 2D bar code after generating the 2D bar code. After the second terminal scans the 2D bar code, the second terminal may re-generate the 2D bar code.

For example, the first terminal is a personal computer (PC) with a LCD screen. A user watches a movie on the PC. If the user needs to go out, the user may use a mobile phone to take a photo of the generated 2D bar code corresponding to the currently playing movie.

Alternatively, the first terminal may send the 2D bar code to the second terminal such that the second terminal obtains the 2D bar code directly from the first terminal via, e.g., an email, a text, an IM (instant message), etc.

Step 204: the second terminal parses the 2D bar code to obtain video playback information included in the 2D bar code. That is, after the second terminal obtains the 2D bar code, the second terminal parses the 2D bar code to obtain the video playback information included in the 2D bar code.

Step 205: the second terminal displays on the display interface selection information on whether to establish a link immediately to allow the user to select whether to establish the link immediately.

In order to improve the user experience effectively, after the second terminal obtains video playback information, the second terminal displays the selection information about whether to establish a link immediately on the display interface and thus allows the user to determine whether to establish the link immediately.

Step 206: if the second terminal receives a user instruction to establish the link immediately as selected by the user, the second terminal establishes the link using the video playback information.

The user can make a selection when the user sees the selection information displayed on the display interface of the second terminal. If the second terminal obtains the instruction to establish the link immediately as selected by the user, the second terminal establishes the link for playing the video using the video playback information. Specifically, the second terminal opens video playing interface based on the video link address included in the video playback information, and then plays the video from the time point corresponding to the elapsed playing time included in the video playback information.

It should be noted that, if the video playback information does not include the playing setting information, the second terminal sets up the video playing based on its own playing setting information. On the other hand, if the video playback information includes the playing setting information, the second terminal sets up the video playing based on the playing setting information included in the video playback information. In this way, the playing setting information is synchronized between the first terminal and the second terminal.

Step 207: if the second terminal obtains an instruction selected by the user to establish a link later, the second terminal stores the video playback information.

That is, if the user selects to establish a link later, the second terminal obtains the instruction to establish a link later, and stores the video playback information. It should be noted that, the selection information about whether to establish a link immediately is displayed on the display interface of the second terminal and is kept for a period of time. If the user does not make a selection within a specified time period (e.g., 10 seconds, 15 seconds, etc.), the second terminal processes the video playback information by a default method. For example, the default method may be to establish the video playing link immediately using the video playback information, or to store the video playback information. In practice applications, the default mode can be set by the user.

The first terminal generates a 2D bar code corresponding to the currently playing video. The 2D bar code includes the video link address and the elapsed playing time of the currently playing video. After the second terminal obtains the 2D bar code, the second terminal establishes a link address using the video link address and the elapsed playing time included in the 2D bar code, or stores the video link address and the elapsed playing time for the user to establish a link in the future. Thus, effective cross-terminal video playing may be achieved and the user experience can be improved.

A specific use scenario may be described below to illustrate the cross-terminal cloud browsing process.

A user A watches an online movie *A Secret That Cannot Be Told* from Tencent video website (http://v.qq.com) using a PC at home. User A is interrupted (e.g., going out) and needs to stop viewing the movie at 58 minutes into the movie. User A runs a 2D bar code generating software installed on the PC at home. The PC obtains a link address and elapsed playing time of the currently playing movie, where the link address is http://v.qq.com/page/Z/O/b/Z0090iU8tOb.html; and the elapsed playing time is 58 minutes.

The PC generates a 2D bar code corresponding to the currently playing movie based on the obtained link address and elapsed playing time. User A takes a photo of the 2D bar code using the camera function of his/her mobile phone. Thus, the user's mobile phone obtains the 2D bar code and parses the 2D bar code to obtain the link address and the elapsed playing time included in the 2D bar code. The display interface of the mobile phone displays the selection information on whether to establish the link immediately. If the user selects to establish the link immediately, the mobile phone opens display interface using the link address and continues to playback the movie from the 58th minute.

Figure 3:
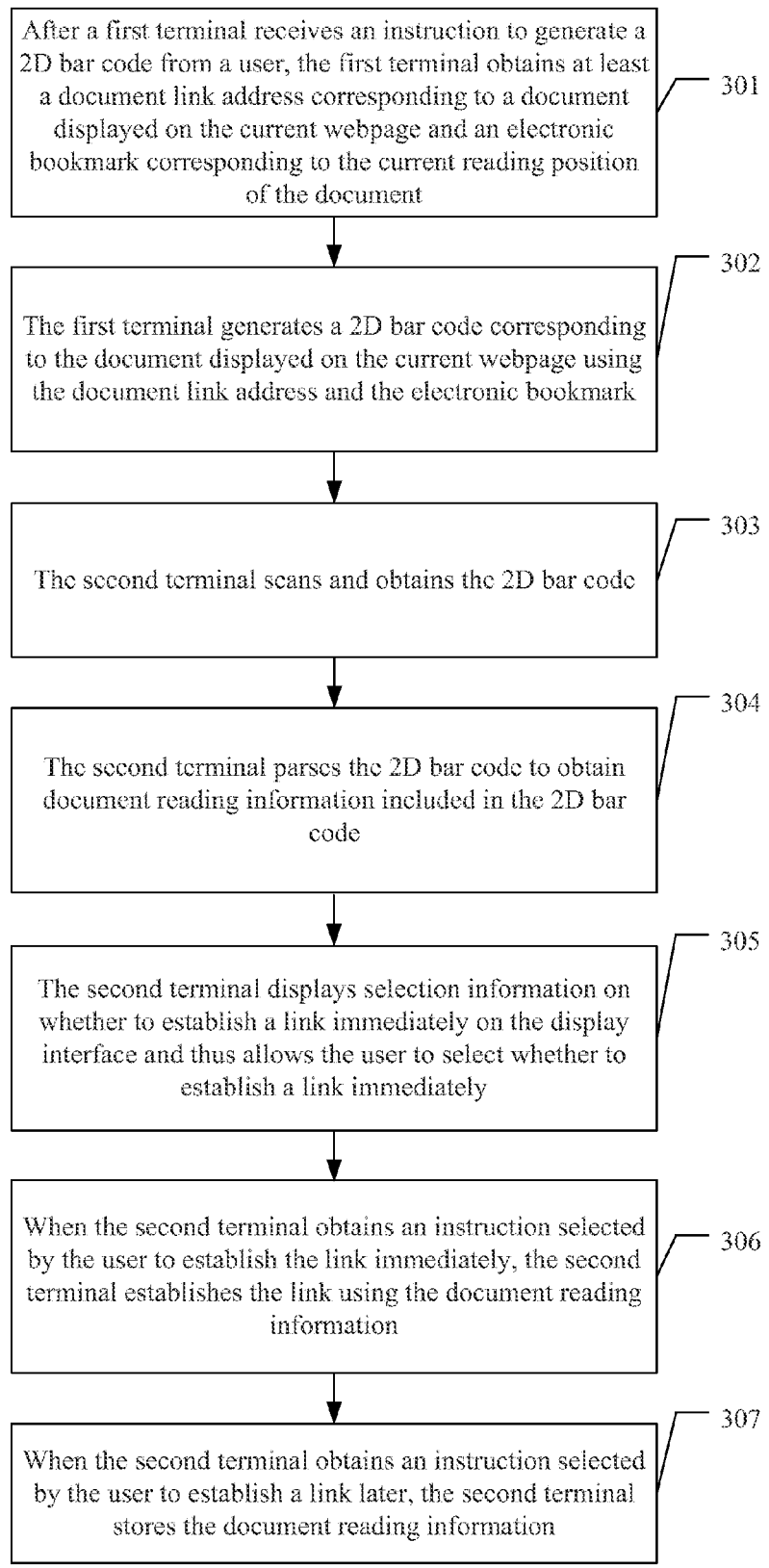
FIG. 3 illustrates a flow diagram of another exemplary cross-terminal cloud browsing method consistent with the disclosed embodiments.

FIG. 3 illustrates a flow diagram of another exemplary cross-terminal cloud browsing process consistent with the disclosed embodiments. As shown in FIG. 3, the cross-terminal cloud browsing process includes the following steps:

Step 301: after a first terminal receives an instruction to generate a 2D bar code from a user, the first terminal obtains at least a document link address corresponding to a document displayed on the current webpage and an electronic bookmark corresponding to the currently reading position of the document.

When a user reads an online document using the first terminal, if the user needs to switch to a second terminal to continue reading the online document, the user may operate the first terminal to send an instruction to generate a 2D bar code. After the first terminal receives the instruction of generating the 2D bar code from the user, the first terminal obtains at least the document link address corresponding to the document displayed on the current webpage and the electronic bookmark corresponding to the currently reading position of the document.

It should be noted that, after the first terminal receives the instruction of generating the 2D bar code from the user, the first terminal generates the electronic bookmark corresponding to the document displayed on the current webpage. The electronic bookmark is used to indicate the position at which the top of the document displayed on the current webpage locates.

The document link address refers to a link that the user needs to access for reading a document. The user uses the document link address to open the document reading interface. In addition, the first terminal can also obtain reading setting information of the currently reading document, which includes font type, font size, background color, and so on.

Step 302: the first terminal generates a 2D bar code corresponding to the document displayed on the current webpage using the document link address and the electronic bookmark.

Step 303: the second terminal scans and obtains the 2D bar code.

Step 304: the second terminal parses the 2D bar code to obtain document reading information included in the 2D bar code.

The first terminal generates a 2D bar code corresponding to a document displayed on the current webpage using the document link address and the electronic bookmark. The second terminal scans and obtains the 2D bar code. After the second terminal obtains the 2D bar code, the second terminal parses the 2D bar code to obtain the document reading information included in the 2D bar code. The document reading information includes the document link address and the electronic bookmark.

Step 305: the second terminal displays selection information on whether to establish a link immediately on the display interface and thus allows the user to select whether to establish a link immediately.

In order to effectively improve the user experience, after the second terminal obtains the document reading information, the second terminal displays the selection information on whether to establish the link immediately on the interface and thus allows the user to select whether to establish the link immediately.

Step 306: if the second terminal obtains an instruction selected by the user to establish the link immediately, the second terminal establishes the link using the document reading information.

The user can make a selection when the user sees the selection information displayed on the display interface of the second terminal. If the second terminal obtains the instruction selected by the user to establish a link immediately, the second terminal establishes a link using the document reading information.

Specifically, the second terminal opens document reading interface based on the document link address included in the document reading information, and then displays the document from the reading position corresponding to the electronic bookmark included in the document reading information. For example, if the electronic bookmark indicates the fifth line of the eighth page of the document, the second terminal may display the document from the fifth line of the eighth page of the document.

It should be noted that, if the document reading information does not include the reading setting information, the second terminal sets up the display of the document based on its own reading setting information; if the document reading information includes the reading setting information, the second terminal sets up the display of the document based on the reading setting information included in the document reading information.

Step 307: if the second terminal obtains an instruction selected by the user to establish a link later, the second terminal stores the document reading information. That is, if the user selects to establish a link later, the second terminal obtains an instruction selected by the user to establish a link later, and stores the document reading information.

It should be noted that, the selection information about whether to establish a link immediately is displayed on the display interface of the second terminal and is kept for a period of time. If the user does not make a selection within a specified time period (e.g., 10 seconds, 15 seconds, etc.), the second terminal processes the document reading information by a default mode. For example, the default mode may be to establish the document reading link immediately and display the document using the document reading information, or to store the document reading information. In practice applications, the default mode can be set by users.

The first terminal generates a 2D bar code corresponding to the document displayed on the current webpage. The 2D bar code includes the document link address and the electronic bookmark of the current document. After the second terminal obtains the 2D bar code, the second terminal establishes the link and displays the document using the document link address and the electronic bookmark, or stores the document link address and the electronic bookmark for the user to establish a link in the future. Therefore, the method may realize effective cross-terminal document reading and improve the user experience.

Figure 4:
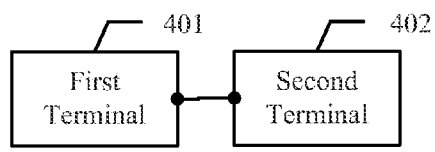
FIG. 4 illustrates a block diagram of an exemplary cross-terminal cloud browsing system consistent with the disclosed embodiments.

FIG. 4 illustrates a block diagram of an exemplary cross-terminal cloud browsing system consistent with the disclosed embodiments. As shown in FIG. 4, the cross-terminal cloud browsing system includes a first terminal 401 and a second terminal 402.

The first terminal 401 is configured to generate a 2D bar code corresponding to a web content currently being presented on a webpage, where the 2D bar code includes at least presentation information of the web content.

The second terminal 402 is configured to obtain the 2D bar code generated by the first terminal. The second terminal is also configured to parse the 2D bar code to obtain the presentation information of the web content contained in the 2D bar code. The second terminal is further configured to establish a link using the presentation information of the web content to realize cross-terminal presentation of the web content on the second terminal.

As used herein, the first terminal 401 generate a 2D bar code corresponding to a web content currently being presented on a webpage, where the 2D bar code includes at least presentation information of the web content. Then, the second terminal 402 obtains the 2D bar code generated by the first terminal. The second terminal also parses the 2D bar code to obtain the presentation information of the web content contained in the 2D bar code. The second terminal further 402 establishes a link using the presentation information of the web content to realize cross-terminal presentation of the web content on the second terminal.

It should be understood that based on users' needs, the web content currently being presented on a webpage may be any video, audio, document, e-book, etc. There are no specific limitations on the web content currently being presented on a webpage. For example, when the web content is a currently playing video, the presentation information of the web content includes video playback information of the currently playing video; when the web content is a document, the presentation information of the web content includes document reading information of the currently displaying document.

The second terminal establishes the link using the parsed video playback information or document reading information to realize cross-terminal video playing back or cross-terminal document reading, improving effectively the user experience.

Figure 5:
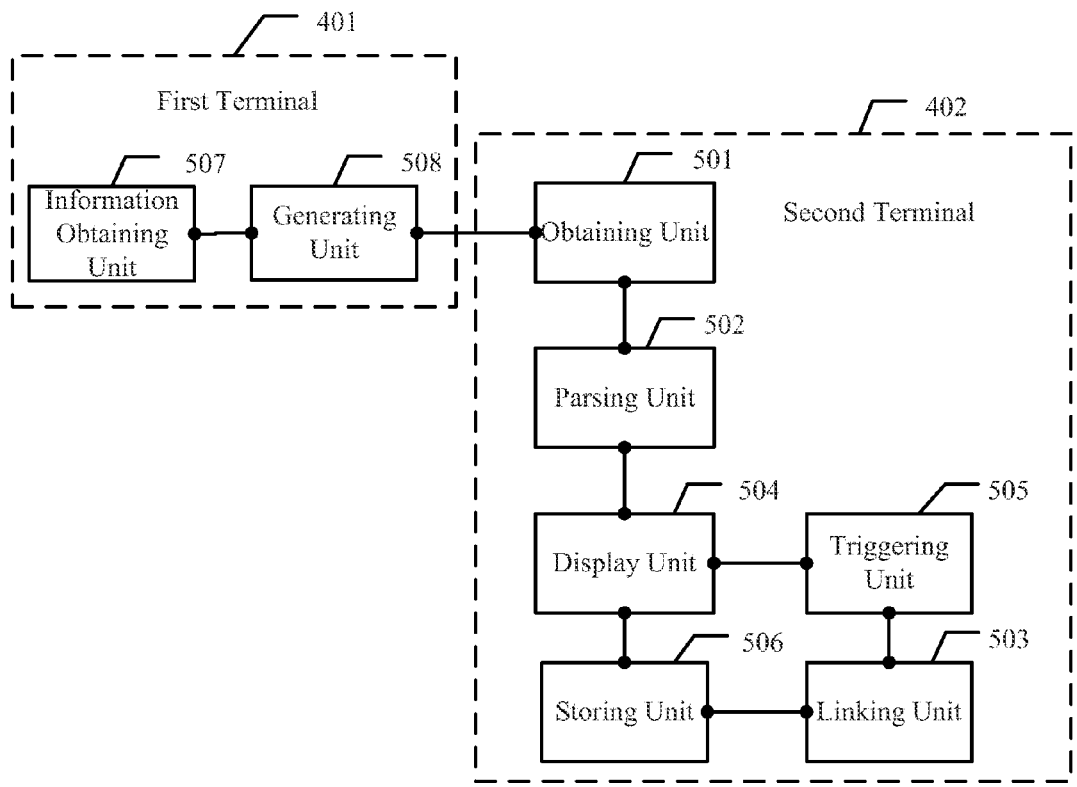
FIG. 5 illustrates a block diagram of another exemplary cross-terminal cloud browsing system consistent with the disclosed embodiments.

FIG. 5 illustrates a block diagram of another exemplary cross-terminal cloud browsing system consistent with the disclosed embodiments. As shown in FIG. 5, the cross-terminal cloud browsing system includes a first terminal 401 and a second terminal 402. The first terminal 401 and the second terminal 402 shown in FIG. 5 are similar to the first terminal 401 and the second terminal 402 shown in FIG. 4. The detailed descriptions about the first terminal 401 and the second terminal 402 are not repeated here.

The second terminal 402 includes an obtaining unit 501, a parsing unit 502, and a linking unit 503. Other units may also be included.

The obtaining unit 501 is configured to obtain the 2D bar code generated by the first terminal. The parsing unit 502 is configured to parse the 2D bar code to obtain the presentation information of the web content contained in the 2D bar code.

The linking unit 503 is configured to establish a link using the presentation information of the web content to realize cross-terminal presentation of the web content on the second terminal after the parsing unit 502 parses the 2D bar code.

In addition, the second terminal 402 also includes a display unit 504, a triggering unit 505, and a storing unit 506.

The display unit 504 is configured to display selection information on whether to establish a link immediately on the display interface to allow the user to select after the parsing unit 502 parses the 2D bar code.

The triggering unit 505 is configured to, after the display unit displays the selection information on the display interface, trigger the linking unit to establish the link using the presentation information of the web content when obtaining an instruction selected by the user to establish a link immediately.

The storing unit 506 is configured to store the presentation information of the web content (e.g., the video playback information, the document reading information, etc.) when obtaining an instruction selected by the user to establish the link later.

The video playback information includes at least a video link address and elapsed playing time of the currently playing video; the document reading information includes at least a document link address corresponding to a document displayed on the current webpage and an electronic bookmark corresponding to the currently reading position of the document.

In addition, the first terminal 401 includes an information obtaining unit 507 and a generating unit 508.

The information obtaining unit 507 is configured to, after receiving an instruction to generate the 2D bar code from a user, obtain at least the video link address and the elapsed playing time of the currently playing video, or obtain at least the document link address corresponding to a document displayed on the current webpage and the electronic bookmark corresponding to the currently reading position of the document.

The generating unit 508 is configured to, after the information obtaining unit 507 obtains the information, generate the 2D bar code corresponding to the currently playing video using the video link address and the elapsed playing time, or generate the 2D bar code corresponding to a document displayed on the current webpage using the document link address and the electronic bookmark.

After receiving an instruction to generate the 2D bar code from a user, the information obtaining unit 507 of the first terminal 401 obtains at least the video link address and the elapsed playing time of the currently playing video, or obtains at least the document link address corresponding to the document displayed on the current webpage and the electronic bookmark corresponding to the currently reading position of the document.

Then, the generating unit 508 of the first terminal 401 generates the 2D bar code corresponding to the currently playing video using the video link address and the elapsed playing time, or generates the 2D bar code corresponding to the document displayed on the current webpage using the document link address and the electronic bookmark.

The obtaining unit 501 of the second terminal 402 obtains the 2D bar code generated by the first terminal. The parsing unit 502 parses the 2D bar code to obtain the presentation information of the web content contained in the 2D bar code. Then, the display unit 504 displays selection information on whether to establish a link immediately on the display interface to allow the user to select after the parsing unit 502 parses the 2D bar code.

After the display unit displays the selection information on the display interface, the triggering unit 505 triggers the linking unit to establish the link using the presentation information of the web content when obtaining an instruction selected by the user to establish a link immediately. The linking unit 503 establishes a link using the presentation information of the web content to realize cross-terminal presentation of the web content on the second terminal after the parsing unit 502 parses the 2D bar code. The storing unit 506 stores the presentation information of the web content (e.g., the video playback information, the document reading information, etc.) when obtaining an instruction selected by the user to establish the link later.

The first terminal generates the 2D bar code corresponding to the currently playing video. The 2D bar code includes the video link address and the elapsed playing time of the currently playing video. After the second terminal obtains the 2D bar code generated by the first terminal, the second terminal establishes a link using the video link address and the elapsed playing time, or stores the video link address and the elapsed playing time for the user to establish a link in the future. Therefore, the method may realize effective cross-terminal video playing, improving the user experience. Or the first terminal generates the 2D bar code corresponding to the document displayed on the current webpage. The 2D bar code includes the document link address and the electronic bookmark of the current document. After the second terminal obtains the 2D bar code, the second terminal establishes the link and displays the document using the document link address and the electronic bookmark, or stores the document link address and the electronic bookmark for the user to establish a link in the future. Therefore, the method may realize effective cross-terminal document reading, improving the user experience.

It should be noted that, in the above system for cross-terminal cloud browsing, each functional module framing is only for illustrative purposes. In practical applications, the above functions are implemented by different functional modules according to the needs. That is, the internal structure of the system for cross-terminal cloud browsing is divided into different functional modules to complete all or part of the functions described above. In addition, idea about the system for cross-terminal cloud browsing provided in the above embodiment is the same as that of the above method for cross-terminal cloud browsing. The specific implementation of the system may refer to the embodiments of the above method, which is not repeated here.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems for cross-terminal cloud browsing, a first terminal generates a 2D bar code corresponding to a web content currently being presented on a webpage, where the 2D bar code includes at least presentation information of the web content. After a second terminal obtains the 2D bar code generated by the first terminal, the second terminal parses the 2D bar code to obtain the presentation information of the web content contained in the 2D bar code. Then, the second terminal establishes a link using the presentation information of the web content to realize cross-terminal presentation of the web content on the second terminal. Therefore, the disclosed methods and systems may realize effective cross-terminal cloud browsing, improving effectively the user experience.

What is claimed is:

1. A method for cross-terminal cloud browsing, comprising:
   presenting a web content on a webpage to a user on a first terminal having cloud browsing capabilities;
   generating, by the first terminal, a 2D barcode corresponding to the web content currently being presented on the webpage, wherein the 2D bar code includes at least a presentation information of the web content;
   obtaining, by a second terminal having cloud browsing capabilities, the 2D bar code;
   parsing, by the second terminal, the 2D bar code to obtain the presentation information of the web content contained in the 2D bar code;
   displaying, by the second terminal and on a display interface, selection information on whether to establish a link immediately to allow the user to select;
   establishing, by the second terminal, a link using the presentation information of the web content on the second terminal when obtaining an instruction selected by the user to establish the link immediately;
   storing, by the second terminal, the presentation information of the web content when obtaining an instruction selected by the user to establish the link later; and
   presenting, by the second terminal, the web content on the webpage to allow the user to continue accessing the web content on the second terminal and realize cross-terminal presentation of the web content.

2. The method according to claim 1, wherein:
   the web content is a currently playing video; and
   the presentation information of the web content includes video playback information of the currently playing video.

3. The method according to claim 2, wherein:
   the video playback information includes at least a video link address, a playing setting information and elapsed playing time of the currently playing video;
   the playing setting information includes one or more of a video definition setting, a aspect ratio and a background setting; and
   the 2D bar code corresponding to the currently playing video is generated by:
     obtaining at least the video link address, the playing setting information and the elapsed playing time of the currently playing video after receiving an instruction to generate the 2D bar code from the user; and
     generating the 2D bar code corresponding to the currently playing video using the video link address, the playing setting information and the elapsed playing time.

4. The method according to claim 3, wherein establishing a link using the video playback information further includes:
   opening, by the second terminal, video playing interface based on the video link address included in the video playback information;
   setting up, by the second terminal, the video playing interface based on the playing setting information included in the video playback information; and
   playing, by the second terminal, the video from the time point corresponding to the elapsed playing time included in the video playback information.

5. The method according to claim 1, wherein:
the web content is a document; and
the presentation information of the web content includes document reading information of the currently displaying document.

6. The method according to claim 5, wherein:
the document reading information includes at least a document link address corresponding to the document displayed on the current webpage, a reading setting information of the document displayed on the current webpage and an electronic bookmark corresponding to the currently reading position of the document;
the reading setting information includes one or more of a font type, a font size, and a background color of the document displayed on the current webpage; and
the 2D bar code corresponding to the document displayed on the current webpage is generated by:
  obtaining at least the document link address corresponding to the document displayed on the current webpage, the reading setting information and the electronic bookmark corresponding to the currently reading position of the document after receiving an instruction to generate the 2D bar code from a user; and
  generating the 2D bar code corresponding to the document displayed on the current webpage using the document link address, the reading setting information and the electronic bookmark.

7. The method according to claim 6, wherein establishing a link using the document reading information further includes:
opening, by the second terminal, document reading interface based on the document link address included in the document reading information;
setting up, by the second terminal, the document reading interface based on the reading setting information included in the document reading information; and
displaying, by the second terminal, the document from the reading position corresponding to the electronic bookmark included in the document reading information.

8. The method according to claim 1, wherein obtaining the 2D bar code by the second terminal further includes one of:
taking a photo of the 2D bar code using a camera function of the second terminal; and
sending, by the first terminal, the 2D bar code to the second terminal via one of an email, a text and an instant message.

9. The method according to claim 1, wherein:
when the user does not make a selection within a specific time period, the second terminal processes the presentation information by a default mode; and
the default method is one of establishing the link immediately and storing the presentation information.

10. A system for cross-terminal cloud browsing, comprising:
a terminal having cloud browsing capabilities configured to include:
  an obtaining unit configured to obtain a 2D bar code generated by a source terminal corresponding to a web content currently being presented on a webpage on the source terminal, wherein the 2D bar code includes at least presentation information of the web content;
  a parsing unit configured to parse the 2D bar code to obtain the presentation information of the web content contained in the 2D bar code;
  a linking unit configured to establish a link using the presentation information of the web content to realize cross-terminal presentation of the web content on the second terminal;
  a display unit configured to display selection information on whether to establish a link immediately on a display interface to allow a user to select;
  a triggering unit configured to, after the display unit displays the selection information on the display interface, trigger the linking unit to establish the link using the presentation information when obtaining an instruction selected by the user to establish a link immediately; and
  a storing unit configured to store presentation information when obtaining an instruction selected by the user to establish the link later.

11. The system according to claim 10, wherein:
the web content is a currently playing video; and
the presentation information of the web content includes video playback information of the currently playing video.

12. The system according to claim 11, wherein:
the video playback information includes at least a video link address corresponding to a currently playing video address, a playing setting information and elapsed playing time of the currently playing video;
the playing setting information includes one or more of a video definition setting, a aspect ratio and a background setting; and
the system for cross-terminal cloud browsing also includes the source terminal having cloud browsing capabilities, comprising:
an information obtaining unit configured to, after receiving an instruction to generate the 2D bar code from a user, obtain at least the video link address, the playing setting information and the elapsed playing time of the currently playing video; and
a generating unit configured to, after the information obtaining unit obtains the video playback information, generate the 2D bar code corresponding to the currently playing video using the video link address and the elapsed playing time.

13. The system according to claim 12, wherein the linking unit is further configured to:
open video playing interface based on the video link address included in the video playback information;
set up the video playing interface based on the playing setting information included in the video playback information; and
play the video from the time point corresponding to the elapsed playing time included in the video playback information.

14. The system according to claim 10, wherein:
the web content is a document; and
the presentation information of the web content includes document reading information of the currently displaying document.

15. The system according to claim 14, wherein:
the document reading information includes at least a document link address corresponding to a document displayed on the current webpage, a reading setting information of the document displayed on the current webpage and an electronic bookmark corresponding to the currently reading position of the document;
the reading setting information includes one or more of a font type, a font size, and a background color of the document displayed on the current webpage; and the system for cross-terminal cloud browsing also includes the source terminal having cloud browsing capabilities, comprising:
an information obtaining unit configured to, after receiving an instruction to generate the 2D bar code from a user, obtain at least the document link address corresponding to a document displayed on the current webpage, the reading setting information and the electronic bookmark corresponding to the currently reading position of the document; and
a generating unit configured to, after the information obtaining unit obtains the document reading information, generate the 2D bar code corresponding to the document displayed on the current webpage using the document link address, the reading setting information and the electronic bookmark.

16. The system according to claim 15, wherein the linking unit is further configured to:
open document reading interface based on the document link address included in the document reading information;
set up the document reading interface based on the reading setting information included in the document reading information; and
display the document from the reading position corresponding to the electronic bookmark included in the document reading information.

17. A system for cross-terminal cloud browsing, comprising:
a first terminal having cloud browsing capabilities configured to generate a 2D bar code corresponding to a web content currently being presented on a webpage, wherein the 2D bar code includes at least presentation information of the web content; and
a second terminal having cloud browsing capabilities configured to include:
an obtaining unit configured to obtain a 2D bar code generated by a first terminal corresponding to a web content currently being presented on a webpage on the first terminal, wherein the 2D bar code includes at least presentation information of the web content;
a parsing unit configured to parse the 2D bar code to obtain the presentation information of the web content contained in the 2D bar code;
a linking unit configured to establish a link using the presentation information of the web content to realize cross-terminal presentation of the web content on the second terminal;
a display unit configured to display selection information on whether to establish a link immediately on a display interface to allow a user to select;
a triggering unit configured to, after the display unit displays the selection information on the display interface, trigger the linking unit to establish the link using the presentation information when obtaining an instruction selected by the user to establish a link immediately; and
a storing unit configured to store presentation information when obtaining an instruction selected by the user to establish the link later.

18. The system according to claim 17, wherein:
the web content is a currently playing video;
the presentation information of the web content includes video playback information of the currently playing video, including at least a video link address corresponding to a currently playing video, a playing setting information and elapsed playing time of the currently playing video, wherein the playing setting information includes one or more of a video definition setting, a aspect ratio and a background setting;
the first terminal further includes:
an information obtaining unit configured to, after receiving an instruction to generate the 2D bar code from a user, obtain at least the video link address and the elapsed playing time of the currently playing video; and
a generating unit configured to, after the information obtaining unit obtains the video playback information, generate the 2D bar code corresponding to the currently playing video using the video link address and the elapsed playing time; and
the linking unit of the second terminal is further configured to includes:
open video playing interface based on the video link address included in the video playback information;
set up the video playing interface based on the playing setting information included in the video playback information; and
play the video from the time point corresponding to the elapsed playing time included in the video playback information.

19. The system according to claim 17, wherein:
the web content is a document;
the presentation information of the web content includes document reading information of the currently displaying document, including at least a document link address corresponding to a document displayed on the current webpage, a reading setting information of the document displayed on the current webpage and an electronic bookmark corresponding to the currently reading position of the document, wherein the reading setting information includes one or more of a font type, a font size, and a background color of the document displayed on the current webpage;
the first terminal further includes:
an information obtaining unit configured to, after receiving an instruction to generate the 2D bar code from a user, obtain at least the document link address corresponding to a document displayed on the current webpage, the reading setting information and the electronic bookmark corresponding to the currently reading position of the document; and
a generating unit configured to, after the information obtaining unit obtains the document reading information, generate the 2D bar code corresponding to the document displayed on the current webpage using the document link address, the reading setting information and the electronic bookmark; and
the linking unit of the second terminal is further configured to:
open document reading interface based on the document link address included in the document reading information;
set up the document reading interface based on the reading setting information included in the document reading information; and
display the document from the reading position corresponding to the electronic bookmark included in the document reading information.

\* \* \* \* \*